(12) United States Patent
Nagano et al.

(10) Patent No.: US 7,715,062 B2
(45) Date of Patent: May 11, 2010

(54) IMAGE READING APPARATUS AND RECORDING APPARATUS INCLUDING IMAGE READING APPARATUS

(75) Inventors: Tatsuaki Nagano, Tokyo (JP); Masashi Kohchi, Tokyo (JP); Hiroshi Kusumoto, Tokyo (JP); Hiroshi Kubo, Koshigaya (JP); Akira Hirose, Tokyo (JP); Masahiro Taniuchi, Yokohama (JP); Takuro Sekiya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1508 days.

(21) Appl. No.: 11/028,972

(22) Filed: Jan. 5, 2005

(65) Prior Publication Data

US 2005/0179963 A1 Aug. 18, 2005

(30) Foreign Application Priority Data

Jan. 5, 2004 (JP) ............................ 2004-000670
Jun. 2, 2004 (JP) ............................ 2004-164712

(51) Int. Cl.
*H04N 1/04* (2006.01)
*B32B 33/00* (2006.01)
*B32B 9/00* (2006.01)

(52) U.S. Cl. ................. 358/474; 358/475; 428/40.7; 428/41.7

(58) Field of Classification Search ............... 257/443, 257/431, 432, 433; 358/474, 475, 480; 428/814, 428/848.2, 40.7, 41.7; 250/552, 559.06, 250/559.07

See application file for complete search history.

(56) References Cited

U.S. PATENT DOCUMENTS

| 5,017,988 | A | * | 5/1991 | Komiyama et al. ......... 136/244 |
|---|---|---|---|---|
| 5,162,183 | A | * | 11/1992 | Lindblad et al. ........... 430/58.8 |
| 5,372,871 | A | * | 12/1994 | Takase et al. .............. 428/209 |
| 6,349,155 | B1 | * | 2/2002 | Youda et al. ............... 382/312 |
| 6,568,931 | B2 | * | 5/2003 | Fujii et al. ................. 425/194 |
| 6,644,658 | B2 | * | 11/2003 | Sheng et al. ............... 271/264 |
| 6,797,324 | B2 | * | 9/2004 | Pollara ...................... 427/271 |
| 7,425,369 | B2 | * | 9/2008 | Oakey et al. ............... 428/412 |
| 2003/0170417 | A1 | * | 9/2003 | Saito et al. ................. 428/66.6 |
| 2004/0263604 | A1 | * | 12/2004 | Endo et al. ................. 347/139 |
| 2005/0074591 | A1 | * | 4/2005 | Zagdoun .................... 428/212 |
| 2005/0179963 | A1 | * | 8/2005 | Nagano et al. ............. 358/475 |
| 2005/0249962 | A1 | * | 11/2005 | Chen et al. ................. 428/480 |
| 2005/0266208 | A1 | * | 12/2005 | Raychaudhuri et al. .... 428/143 |
| 2006/0000809 | A1 | * | 1/2006 | Matsumoto ................. 216/91 |

FOREIGN PATENT DOCUMENTS

| JP | 63-303561 | 12/1988 |
|---|---|---|
| JP | 4-29366 | 1/1992 |
| JP | 06-289675 | 10/1994 |

(Continued)

*Primary Examiner*—Jerome Grant, II
(74) *Attorney, Agent, or Firm*—Oblon, Spivak, McClelland, Maier & Neustadt, L.L.P.

(57) ABSTRACT

An image reading apparatus configured to be disposed in an image forming apparatus. An image reading unit is configured to read an image from a document. A light permeable member has a surface configured to face the image on the document, the surface having a roughness of at most 0.5 S. A coating is disposed on the surface of the light permeable member, the coating configured to prevent adherence of contaminants on the surface.

15 Claims, 5 Drawing Sheets

FOREIGN PATENT DOCUMENTS

| | | |
|---|---|---|
| JP | 08-146829 | 6/1996 |
| JP | 08-165034 | 6/1996 |
| JP | 08-290850 | 11/1996 |
| JP | 08-307695 | 11/1996 |
| JP | 09-304844 | 11/1997 |
| JP | 10-073890 | 3/1998 |
| JP | 2000-191168 | 7/2000 |
| JP | 2000-312281 | 11/2000 |
| JP | 2000-313530 | 11/2000 |
| JP | 2001-031284 | 2/2001 |
| JP | 2001-042578 | 2/2001 |
| JP | 2001-066832 | 3/2001 |
| JP | 2002-051194 | 2/2002 |
| JP | 2002-189319 | 7/2002 |
| JP | 2002-354191 | 12/2002 |
| JP | 2003-092668 | 3/2003 |
| JP | 2003-134302 | 5/2003 |
| JP | 2003-295357 | 10/2003 |
| JP | 3522458 | 2/2004 |

* cited by examiner

IMAGE READING APPARATUS AND RECORDING APPARATUS INCLUDING IMAGE READING APPARATUS

BACKGROUND OF THE INVENTION (i) Field of the Invention

The present invention relates to an image reading apparatus, as well as a recording apparatus including the image reading apparatus.

(ii) Discussion of the Background

It is known to read images by a so-called sheet through method. In the sheet through method, a document is transported in a sub-scanning direction over a background reading apparatus. The reading apparatus includes a reading unit disposed at a fixed position. By this arrangement, the reading unit reads the portion of the document over the reading unit.

However, a contact glass of the reading unit may become contaminated with recording medium dust, because the document is transported over and contacts the contact glass. The contamination adversely affects the quality of the images read by the contact glass, which results in poor quality images formed a writing unit. Specifically, while contaminants on a contact glass of an image reading apparatus that does not use the sheet through method result in the formation of stray dots on an output copy, contaminants on the contact glass in an image forming apparatus that does use the sheet through method result in the formation of stripes on the output copy.

Known contaminants include floating contaminants and adhered contaminants. The floating contaminants include dust, recording medium powders and toner powders, while adhered contaminants are generally formed by deposition of toners from the document to the contact glass, since adhesives coated on the document are transferred to the contact glass when the document contacts the contact glass.

It is known to use a reading apparatus in which the image is read without permitting the document to contact the contact glass, to avoid adhesion of the adhesives and adhered contaminants on the contact glass. However, it is likely that the floating contaminants, such as the recording medium powders, will still settle on the contact glass and cause the quality of the images formed by the image forming apparatus to deteriorate.

SUMMARY OF THE INVENTION

To address the above-described and other problems, it is an object of the present invention to provide an image reading apparatus configured to be disposed in an image forming apparatus. An image reading unit is configured to read an image from a document. A light permeable member has a surface configured to face the image on the document, the surface having a roughness of at most 0.5 S. A coating is disposed on the surface of the light permeable member, the coating configured to prevent adherence of contaminants on the surface.

The present invention further provides means for reading an image from a document. Means are used for permitting light to be transmitted from the image of the document, the means for permitting includes a surface having a roughness of at most 0.5 S. Means are used for preventing adherence of contaminants, the means for preventing coated on the surface.

The present invention still further provides a method of forming a light permeable member configured to read an image from a document in an image forming unit, including forming a first portion of the light permeable member, and forming a second portion of the light permeable member, the second portion having a stepped shape.

It is to be understood that both the foregoing general description of the invention and the following detailed description are exemplary, but are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE INVENTION

In describing preferred embodiments shown in the drawings, specific terminology is employed for the purpose of clarity. However, the following description is not intended to be limited to the specific terminology used, and it is to be understood that each element can include all equivalents that operate in a similar manner.

Figure 1:
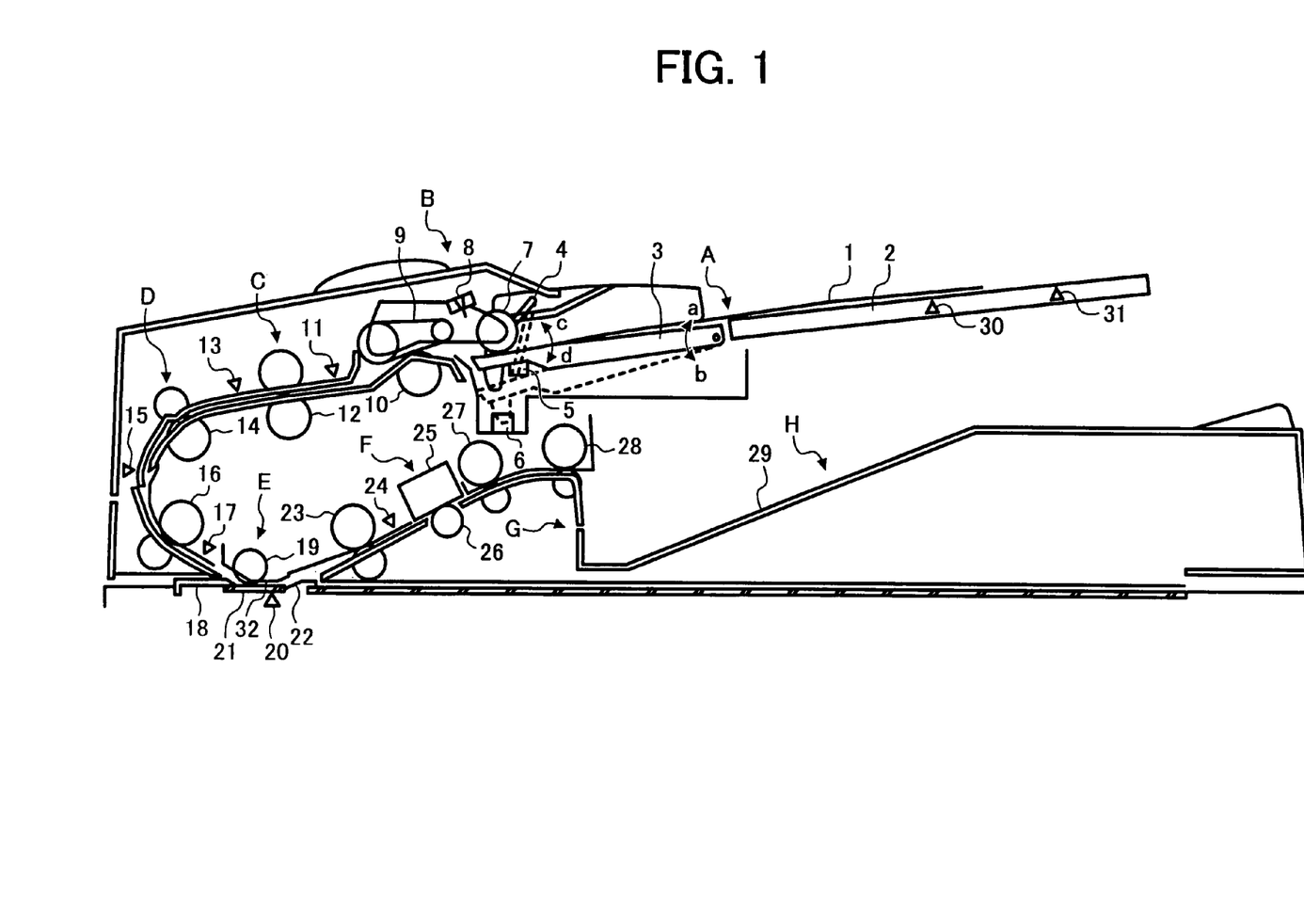
FIG. 1 shows a cross-sectional view of an image forming apparatus.
Figure 2:
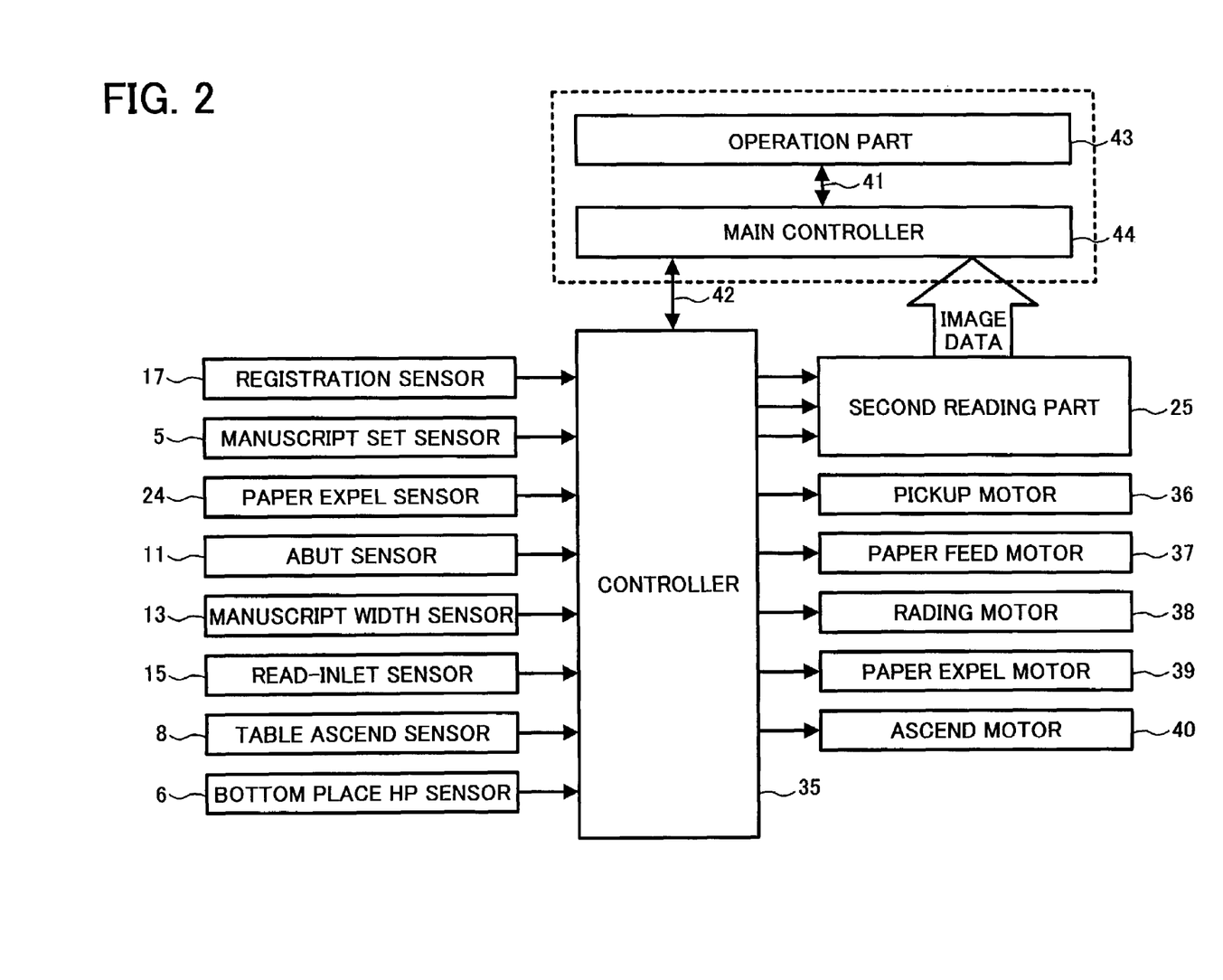
FIG. 2 shows a block diagram of a controller for the image forming apparatus of FIG. 1.

Referring now to the drawings, where like reference numerals designate identical or corresponding portions throughout the several views, FIGS. 1 to 5 show an embodiment of an image reading apparatus and a recording apparatus including the image reading apparatus, in accordance with the present invention. FIG. 1 shows a cross-sectional view of an image forming apparatus. FIG. 2 shows a block diagram of a controller for the image forming apparatus of FIG. 1.

The figures show a copy machine as an example of an image forming apparatus. A copy machine can be an electrophotographic copy machine that uses a Carlson process to form images. The Carlson process can include forming an electrostatic latent image on a photosensitive drum (or a belt or sheet), converting the latent image into a real image (development) with a toner, transferring the toner image to a recording medium (e.g., a sheet of recording medium), and fixing the image on the recording medium by compression and heating.

The figures show examples of the image reading apparatus as a copy machine configured to form images based on the Carlson process. However, an ink-jet recording method can also use the Carlson process to form images. Thus, it is to be understood that features of the present invention can be applied to any reading or recording apparatus and/or image forming apparatus including the reading or recording apparatus, including an ink-jet image forming apparatus, as well as to recording apparatuses based on other recording principles (for example a heat-sensitive recording method and heat-transport method taking advantage of thermal heads).

As shown in FIG. 1, the image forming apparatus includes a document set portion A to house a stack of documents to be read. A separation and feed portion B feeds one sheet from the stack of documents after separating the sheet from the stack of documents.

A resist portion C is used for primary abutting alignment of the fed documents and for pick-up and transport of the aligned document, and a turn portion D is used for transporting the document by turning its read face side downward. A first read transport portion E is used for reading the image on the surface of the document from below a contact glass. A second read transport portion F is used for reading the back surface of the document after reading the top surface of the document, and a recording medium-output portion G is used to output the document after the back surface of the document has been read. A stack portion H is used for stacking and folding the document after reading, while drive portions 36 to 40 are used for transport driving, and a controller 35 is used for controlling these successive operations.

The image data read in the vicinity of the first read transport portion E and the second read transport portion F is sent to a main controller by a data transmission unit, and is processed by an image data processing unit for processing the data as binary or multi-values (gradations). The processed data is sent to a recording portion (recording unit) by a transmission unit as recording signal instructions, and the data is recorded on a recording medium, such as paper, according to the recording signal instructions.

The stack of documents 1 to be read is placed on a document table 2 including a movable document table 3, so that the top surface of the document faces upward. The stack of documents 1 is positioned with a side guide (not shown) so that a direction of a width is perpendicular to a transport direction.

Setting of the document is sensed by a set filler 4 and set sensor 5, and the sensed set signal is transmitted to a main controller 44 with I/F 42. An approximate length of the document in the transport direction is determined by one or both of document length sensors 30 and 31 provided on the document table. The document length sensors can include a reflection sensor, or an actuator sensor capable of sensing even one sheet of the document is used, and can be disposed so that one or both of longitudinal and transverse directions of the same document can be determined.

The movable document table 3 is movable up and down in the a- and b-directions shown in the drawing, by a bottom plate ascending motor 40. The movable document table 3 ascends so that the upper most surface of the stack of documents contacts a pick-up roller 7, by rotating the bottom plate ascending motor 40 clockwise when the set filler 4 and document set sensor 5 sense that the documents have been set.

The pick-up roller 7 is operated in the c- and d-directions with a cam mechanism driven by a pick-up motor 36. The pick-up roller 7 presses against the upper surface of the document when the movable document table 3 ascends, and the upper limit of the surface of the document can be sensed by a table ascending sensor 8.

When a print key (not shown) of an operation portion 43 is actuated, a document feed signal is transmitted from the main controller 44 to an ADF controller 35 through I/F 42. One or more rollers of the pick-up roller 7 are rotated by the clockwise rotation of a recording medium feed motor 37 to pick-up one or more sheets (preferably one sheet) of the documents on the document table 2.

The roller rotates in a direction for feeding the uppermost document to a recording medium feed port. The recording medium feed belt 9 is driven in a recording medium feed direction by clockwise rotation of the recording medium feed motor 37 in a direction opposite the recording medium feed direction. A reverse roller 10 is driven to rotate in a direction opposite the recording medium feed direction to enable the uppermost document to be fed by separating the upper most document from the documents below the document to be fed.

The reverse roller 10 contacts a recording medium feed roller with a given pressure, and is rotated in a counterclockwise direction by the rotation of the recording medium feed belt 9 when the roller contacts the recording medium feed belt 9 through contact with the document.

The force rotating the reverse roller is determined to be lower than a set level of a torque limiter when at least two sheets of the documents are disposed between the recording medium feed belt 9 and reverse roller 10. The reverse roller rotates in the clockwise direction as a normal drive direction, and pushes back excess documents to prevent transport of multiple, overlapped documents.

The document is transported by the recording medium feed belt 9. The forward end of the document is sensed by an abutment sensor 11, and abuts a stationary pull-out roller 12.

The document advances a predetermined distance after being sensed by the abutment sensor 11. Consequently, the recording medium feed belt 9 stops by suspending the rotation of the recording medium feed motor 37 while the document is pressed onto the pull-out roller 12 having been bent a predetermined amount.

The pick-up roller 7 is urged from the upper surface of the document by rotating the pick-up roller 36, and the document is transported by the transport force of the recording medium feed belt to allow the forward end of the document to enter a nip between the upper and lower rollers of the pull-out roller 12. By this process, the end of the document is aligned (i.e., any skew of the document is corrected).

The pull-out roller 12 corrects skew of the rear end of the document, and transports the document after the skew correction to an intermediate roller 14. The pull-out roller is driven by inverse rotation of the recording medium feed motor 37.

The pick-up roller 7 and recording medium feed belt 9 may be turned off while the pull-out roller 12 and intermediate roller 14 are driven by inverse rotation of the recording medium feed motor 37. One or more document width sensors 13 are aligned in the forward direction of the document, and sense the size of the document, transported with the pull-out roller 12, in the direction of width perpendicular to the transport direction.

The length of the document in the transport direction is read by the pulse number of the motor by sensing the forward and rear ends of the document with the abutment sensor 11. The transport rate at the resist portion C is determined to be higher than the transport rate at the transport portion E when the document is transported from the resist portion C to the turn portion D by driving the pull-out roller 12 and intermediate roller 14, to shorten the processing time for transporting the document into the document read portion (image read portion).

Deceleration of the document transport rate is initiated to permit the document transport rate to be equal to the reading feed rate before the front end of the document enters the nip between a pair of the upper and lower rollers of the read inlet roller 16, when an inlet sensor 15 senses the front end of the document.

Figure 3:
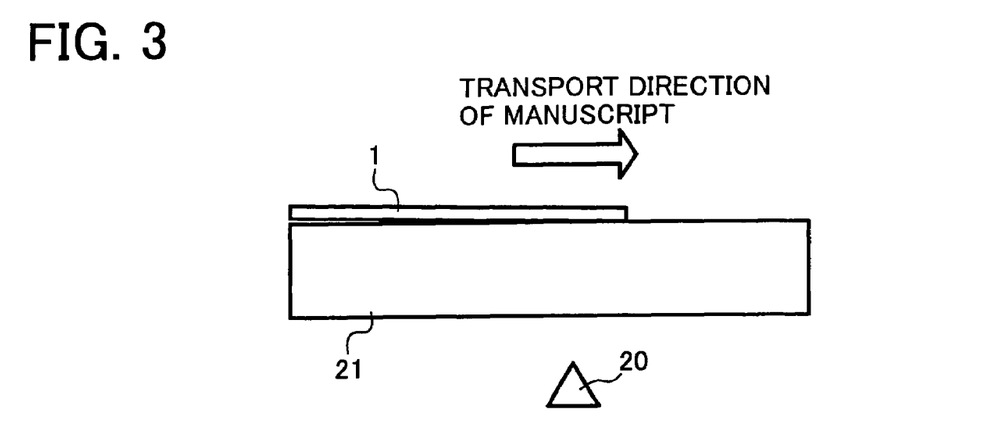
FIG. 3 is a side view showing a front end of the document while the document is being transported.
Figure 4:
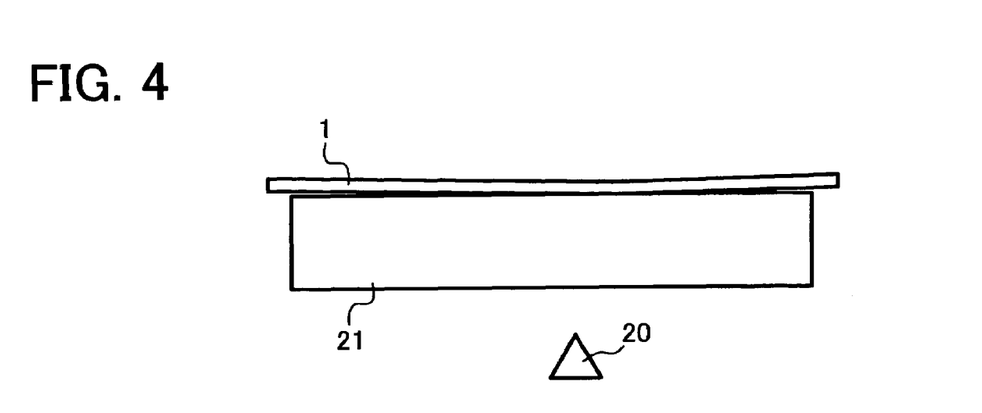
FIG. 4 is a side view showing a central portion of the document while the document is being transported.

The intermediate roller 14, the read inlet roller 16, a read roller 19, a read outlet roller 23 and a CIS outlet roller 27 are driven by simultaneously driving a read motor 38 clockwise. The intermediate roller 14 is driven in communication with the recording medium feed motor 37 and read motor 38, and a one-way clutch that slips in the same direction of rotation as the rotation of the intermediate roller is provided in the pulley to transmit drive of the intermediate roller and recording medium feed roller to the intermediate roller 14. The rotation speed of the intermediate roller follows the higher rotation speed when both the recording medium feed motor and read motor are driven (as shown in FIGS. 3 and 4).

Figure 12:
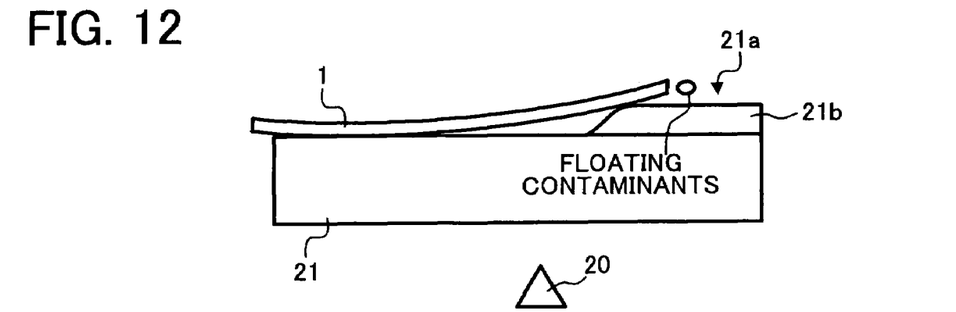

Accordingly, the intermediate roller is driven by the recording medium feed motor 37 that is driven at a high speed when the document is transported into the turn portion D from the resist portion C, while the intermediate roller is driven by the read motor 38 when the recording medium feed motor is halted (as shown in FIG. 12).

The document is decelerated within a given transport distance when the resist sensor 17 senses the front end of the document, and is halted in front of a reading position 20 while a resist stop signal is sent to the main controller 44 via I/F 42. The document halted at the resist is transported by accelerating so that the transport speed is increased until the front end of the document reaches the reading position by receiving a read start signal from the main controller 44.

A gate signal indicating an effective image region in the sub-scanning direction is transmitted to the main controller 44 until the rear end of the document passes through the first read portion at a timing of the pulse counts of the read motor when the front end of the document sensed reaches the image read portion.

The document is transported by a predetermined distance by inverse rotation of the recording medium feed motor 37 after the rear end of the document has been sensed by the abutment sensor 11. The recording medium feed motor 37 is switched to clockwise rotation at an approximate position where the rear end of the document passes through the pull-out roller 12, and stops driving of the pull-out roller 12 and intermediate roller 14.

The intermediate roller 14 is driven by the read motor 38. After passing through the read transport portion E, the document is outputted to the recording medium output portion G through the second read portion when only one surface of the document is read. The recording medium output roller 28 is rotated counterclockwise by counterclockwise rotation of a recording medium output motor 39 by sensing the front end of the document with a recording medium output sensor 24.

The driving speed of the recording medium output motor is controlled so that the document outputted into a recording medium discharge tray 29 does not jump out of the tray, by decelerating the driving speed of the recording medium output motor immediately before the rear end of the document is released from the nip between a pair the recording medium output rollers 28 using the pulse count of the recording medium output motor after sensing the front end of the document with the recording medium output sensor 24.

When both surfaces of the document are read, a gate signal indicating the effective image area in the sub-scanning direction is transmitted from the DF control portion 35 to the second main read portion 25 until the rear end of the document passes through the read portion at a timing of the pulse count of the read motor between the time when the front end of the document is sensed by the recording medium output sensor 24 and when the front end of the document reaches the second read portion 25.

The second read roller 26 is provided for preventing the document from being urged up at the second read portion 25 while the roller serves as a standard of whiteness for acquiring a shading data at the second reading position 25.

FIG. 1 also shows the disposition of a bottom plate home position sensor 6, a table ascending sensor 8, the document width sensors 13, the inlet sensor 15 and the recording medium output sensor 24.

Figure 5:
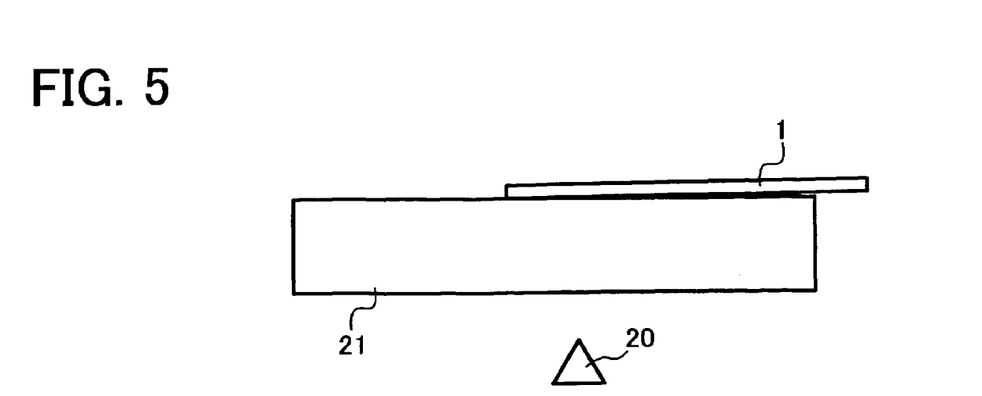
FIG. 5 is a side view showing a rear end of the document while the document is being transported.

Features of the present invention are described below. FIGS. 3 to 5 show transport of the document when the document is read. FIG. 3 is a side view showing a front end of the document while the document is being transported, FIG. 4 is a side view showing a central portion of the document while the document is being transported, and FIG. 5 is a side view showing a rear end of the document while the document is being transported.

As shown in the drawings, the document is transported in contact with the surface of the contact glass 21. Cellulose fibers of the recording medium, and particles of additives with a particle size of 0.5 to 10 μm such as talc, clay, calcium carbonate and titanium oxide, as well as particles of surface modifiers with a particle size of 0.5 to 10 μm such as kaolin ($Al_2O_3.2SiO_2.2H_2O$), calcium carbonate ($CaCO_3$) and satin white ($3CaO.Al_2O_3.3CaSO_4.31-32H_2O$) coated on the surface of recording medium, fall from the recording medium in powder form and are deposited on the surface of the contact glass 21.

Toner fine powders attached to the surface of the document and adhesive substances such as an adhesive paste used for revision of the document are also attached to the contact glass. Contaminants such as dust floating in air may be attached, or the contact glass may be occasionally contaminated with the sweat and fingerprints, and other body oils.

While the member between the document read portion and the document is described as the contact glass, the present invention need not be applied to glass. Therefore, the member between the document read portion and the document may be any light permeable members, or transparent members. Restated, any light permeable members, or transparent members, such as plastic materials including an acrylic resin as well as the glass may be used as the contact glass.

When the document is read by allowing the document read portion to move while the document is stationary as in usual copy machines, contaminants on the surface of the contact glass results in the formation of black spots at only the contaminated portions. However, when the document is read by allowing the document to move while the document read portion is stationary, a single spot on the surface of the contact glass 21 can result in the formation of a stripe extending in the sub-scanning direction.

To prevent the undesired result, the surface of the contact glass 21 facing the document should avoid contamination as much as possible. In this case, the surface of the contact glass 21 facing the document was modified.

Materials coated with fluorine are known to possess characteristics including that they are "hardly adhesive", "water and oils repelling" and have "good slidability" properties. While a water-proof spray is generally used, the inventors determined that these featured may be effective for prevention of contamination in addition to the water-proof property.

Specific examples of the fluorine-containing coating materials include compounds with fluorine such as fluorinepolytetrafluoroethylene, polyvinylidene fluoride, polyvinyl fluoride, polychlorotrifluoroethylene, tetrafluoroethylenehexafluoropropylene copolymers, ethylene-tetrafluoroethylene copolymers, ethylene-chlorotrifluoroethylene copolymers, tetrafluoroethylene-perfluoroalkylvinylether copolymers, perfluorocyclopolymers, vinyl ether-fluoroolefin copolymers, vinyl ester-fluoroolefin copolymers, tetrafluoroethylene-vinyl ether copolymers, chlorotrifluoroethylene-vinylether copolymers, tetrafluoroethylene-urethane crosslinking polymers, tetrafluoroethylene-epoxy crosslinking polymers, tetrafluoroethylene-acrylic crosslinking polymers, and tetrafluoroethylene-melamine crosslinking polymers.

In addition, silicone coating materials, which also have an oil-repellent property, can be used. Specific examples of the silicone coating materials include methyltrimethoxysilane, methyltriethoxysilane, methyltrichlorosilane, methyltribromosilane, methyltriisopropoxysilane, methyltri-t-butoxysilane, ethyltrimethoxysilane, ethyltriethoxysilane, ethyltrichlorosilane, ethyltribromosilane, ethyltriisopropoxysilane, ethyltri-t-butoxysilane, n-propyltrimethoxysilane, n-propyltriethoxysilane, n-propyltrichlorosilane, n-propyltribromosilane, n-propyltriisopropoxysilane, n-propyltri-t-butoxysilane, n-hexyltrimethoxysilane, n-hexyltriethoxysilane, n-hexyltrichlorosilane, n-hexyltribromosilane, n-hexyltriisopropoxysilane, n-hexyltri-t-butoxysilane, n-decyltrimethoxysilane, n-decyltriethoxysilane, n-decyltrichlorosilane, n-decyltribromosilane, n-decyltriisopropoxysilane, n-decyltri-t-butoxysilane, n-octyltrimethoxysilane, n-octyltriethoxysilane, n-octyltrichlorosilane, n-octyltribromosilane, n-octyltriisopropoxysilane, n-octyltri-t-butoxysilane, phenyltrimethoxysilane, phenyltriethoxysilane, phenyltrichlorosilane, phenyltribromosilane, phenyltriisopropoxysilane, phenyltri-t-butoxysilane, dimethyldichlorosilane, dimehyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmehyldibromosilane, phenylmethyldimethoxysilane, phenylmethyldiethoxysilane, vinyltritrichlorosilane, vinyltribromosilane, vinyltrimethoxysilane, vinyltriethoxysilane, vinyltriisopropoxysilane, vinyltri-t-butoxysilane, trifluoropropyltritrichlorosilane, trifluoropropyltribromosilane, trifluoropropyltrimethoxysilane, trifluoropropyltriethoxysilane, trifluoropropyltriisopropoxysilane, trifluoropropytri-t-butoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane, γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyltri-t-butoxysilane, γ-methylcaptopropylmethyldimethoxysilane, γ-methylcaptopropylmethyldiethoxysilane, γ-methylcaptopropyltrimethoxysilane, γ-methylcaptopropyltriethoxysilane, γ-methylcaptopropyltriisopropoxysilane, γ-methylcaptopropyltri-t-butoxysilane, β-(3,4-epoxycyclohexyl) ethyltrimethoxysilane, β-(3,4-epoxycyclohexyl) ethyltriethoxysilane, hydrolysates of the above-mentioned compounds, polycondensation polymers of the above-mentioned compounds, etc.

In another example, a photocatalytic oxide may be provided as a surface modification layer. While examples of the photocatalytic oxide include metal oxides such as ZnO, $SnO_2$, $SrTiO_3$, $WO_3$, $Bi_2O_3$ and $Fe_2O_3$, titania ($TiO_2$) is most preferred. Titania is nontoxic, chemically stable and is relatively inexpensive. Moreover, because titania has a high band gap energy and is excited with UV light and does not absorb visible light, there is no color emission due to complementary color components. Accordingly, titania is particularly suitable for coating transparent members such as the contact glass, lens and mirror as disclosed in the embodiment of the present invention.

Other possible surface modification methods include plasma treatment to provide water repellence and contamination resistance. The surface of the contact glass can be modified by placing the contact glass in a plasma generated by discharge of several tens of watts in a gas at a low pressure of 2 to 10 mmHg.

The surface of the contact glass was modified, based on the above discussion, to determine which methods could effectively prevent contamination.

A float glass (manufactured by Nippon Sheet Glass Co., chemically reinforced glass, FL=3.2) with a surface roughness of 0.5 S or less was used.

The surface roughness was controlled because contaminants trapped in fine recesses cannot be removed when the surface roughness exceeds 0.5 S. While examples of contaminants that are problems in the embodiment of the present invention are particles of recording medium additives and surface modification agents, these particles have a size of 0.5 to 10 μm. The contaminant particles (particles with a size of about 0.5 μm as the lower limit of the size of the contaminant particles) are trapped in the recesses of the rough surface when the surface roughness of the glass is larger than 0.5 S, and the contaminant particles cannot be easily removed.

For example, several glasses each having different surface roughness were prepared, and fine particles of calcium carbonate ($CaCO_3$) were sprayed onto the surface. The calcium carbonate particles were blown off with a blower to investigate the amount of remaining calcium carbonate ($CaCO_3$). Although no residual calcium carbonate ($CaCO_3$) particles were observed when the surface roughness is in the range of 0.5 S to 0.1 S, the fine particles could not be sufficiently removed even by blowing with the blower when the surface roughness exceeds 0.5 S, for example 1 S.

Second, no specular appearance was visually observed and the surface the surface became cloudy when the surface roughness is larger than 0.5 S (for example 1 s or more). This means that light permeability is impaired to adversely affect image reading performance when the glass is used as the contact glass. On the contrary, the surface becomes almost specular at least by visual observation when the surface roughness is 0.5 S or less, and light permeability sufficient for optical elements may be attained.

Samples 1 to 19 subjected to the following surface modification (sample 19 is untreated) on the surface of the glass each having the surface roughness as described above were used in the embodiment of the present invention. The amount of the residual toner when a toner was blown off with a blower after spraying on the surface (contaminant removing effect) and adhesion of contaminants when fingerprints were attached on the surface (contamination preventive effect) were evaluated. The contaminated sample glass was used as a contact glass for the document reading portion of a electrophotographic digital copy machine, and deterioration of images, if any, was evaluated (evaluation of practical applicability).

Samples

Sample 1: FG-5010 (fluorine coating agent manufactured by Fluoro-Technologies, Co.) was spray-coated at a thickness of about 0.1 μm.

Sample 2: FG-5010 (fluorine coating agent manufactured by Fluoro-Technologies, Co.) was spray-coated at a thickness of about 0.05 μm.

Sample 3: FG-7000 (fluorine coating agent manufactured by Fluoro-Technologies, Co.) was spray-coated at a thickness of about 0.1 μm.

Sample 4: FG-7000 (fluorine coating agent manufactured by Fluoro-Technologies, Co.) was spray-coated at a thickness of about 0.05 μm.

Sample 5: Optool DSX (fluorine coating agent manufactured by Daikin Industries, Ltd.) was spray-coated at a thickness of about 0.1 μm.

Sample 6: Optool DSX (fluorine coating agent manufactured by Daikin Industries, Ltd.) was spin-coated at a thickness of about 0.1 μm.

Sample 7: Optool DSX (fluorine coating agent manufactured by Daikin Industries, Ltd.) was vacuum deposited at a thickness of about 0.0005 μm.

Sample 8: Optool DSX (fluorine coating agent manufactured by Daikin Industries, Ltd.) was vacuum deposited at a thickness of about 0.001 μm.

Sample 9: Optool DSX (fluorine coating agent manufactured by Daikin Industries, Ltd.) was vacuum deposited at a thickness of about 0.05 μm.

Sample 10: Optool DSX (fluorine coating agent manufactured by Daikin Industries, Ltd.) was vacuum deposited at a thickness of about 0.1 μm.

Sample 11: Optool DSX (fluorine coating agent manufactured by Daikin Industries, Ltd.) was vacuum deposited at a thickness of about 1 μm.

Sample 12: Optool DSX (fluorine coating agent manufactured by Daikin Industries, Ltd.) was sputtered at a thickness of about 0.05 μm.

Sample 13: Optool DSX (fluorine coating agent manufactured by Daikin Industries, Ltd.) was sputtered at a thickness of about 0.1 μm.

Sample 14: Silicone Spray KF96SP (silicone coating agent manufactured by Shin-Etsu Chemical Co.) was spray-coated at a thickness of about 0.1 μm.

Sample 15: Silicone Spray (silicone coating agent manufactured by Kure Engineering, Ltd.) was spray-coated at a thickness of about 0.1 μm.

Sample 16: α-Silicone Spray (silicone coating agent manufactured by Trusco Nakayama Co.) was spray-coated at a thickness of about 0.1 μm.

Sample 17: Vlatitan 5606 (titanium-base coating agent manufactured by Nihon Parkerizing Co.) was spray-coated at a thickness of about 0.1 μm.

Sample 18: plasma treatment (subjected to plasma discharge at 30 W for 180 seconds in argon gas at $10^{-2}$ mmHg)

Sample 19: no treatment

RESULTS OF EVALUATION

| | Spray of Recording medium Powder | Spray of Toner | Adhesion of Fingerprint | Total Evaluation |
|---|---|---|---|---|
| Sample 1 | C | C | B | Good |
| Sample 2 | C | C | B | Good |
| Sample 3 | B | C | C | Good |
| Sample 4 | B | C | C | Good |
| Sample 5 | B | C | B | Good |
| Sample 6 | B | C | B | Good |
| Sample 7 | C | C | D | Poor |
| Sample 8 | A | A | B | Quite Excellent |
| Sample 9 | A | A | B | Quite Excellent |
| Sample 10 | A | A | B | Quite Excellent |
| Sample 11 | — | — | — | — |
| Sample 12 | B | B | B | Excellent |
| Sample 13 | B | B | B | Excellent |
| Sample 14 | C | C | D | Poor |
| Sample 15 | C | C | D | Poor |
| Sample 16 | C | C | D | Poor |
| Sample 17 | C | C | D | Poor |
| Sample 18 | B | C | D | Poor |
| Sample 19 | D | D | D | Poor |

EVALUATION CRITERIA
A: large contamination preventive effect, practical
B: contamination preventive effect is observed, no practical problems
C: although contamination preventive effect is observed, some practical problems may arise
D: almost no contamination preventive effect; difficult for practical application
—: not evaluated since light does not permeate due to too thick coating material
The results of the total evaluation show practical applicability based on the three evaluation items. "Quite excellent", "excellent", "good" and "poor" represent practical applicability in this order ("quite excellent" being the highest mark).

The results above showed that surface modification with the fluorine coat material has a high contamination preventive effect with excellent practical applicability. It was also shown that vacuum deposition of the fluorine coat material exhibits the highest contamination preventive effect. While a thickness of 0.0005 μm of the coating film formed by vacuum deposition is not as effective as other treatment, it was shown that a thickness of 0.001 μm or more is sufficient to prevent contamination.

While the coating film formed by sputtering showed a good contamination preventive effect, vacuum deposition was generally better than sputtering for preventing contamination.

Vacuum deposition of Optool DSX as the fluorine coat material manufactured by Daikin Industries, Ltd., showed the best contamination preventive effect over other methods. While vacuum deposition at a thickness of 0.001 μm or more is effective, the upper limit should be restricted to about 0.1 μm, or about 100 times of the lower limit, based on economic, productivity and practical applicability consideration.

FIG. 3 illustrates the front end of the document while the document is being transported on the planar flat contact glass. Optool DSX as the fluorine coat material manufactured by Daikin Industries, Ltd., which is the material that affords the best results in the evaluation above, is vacuum-deposited on the surface of the contact glass (the document transport surface) at a thickness of about 0.02 μm. FIG. 4 illustrates the middle portion of the document while the document is being transported on the planar flat contact glass. FIG. 5 illustrates the rear end of the document while the document is being transported on the planar flat contact glass.

Although recording medium powders and toner are removed from the document by contact of the document with the contact glass, the recording medium powders and toner, or contaminants floating in air, are neither adhered to nor deposited (left behind) on the contact glass as a result of the surface modification described above. The contaminants are carried away by the transport of the document. Accordingly, these contaminants are not read by the image reading apparatus as contaminant image information, and high quality images are maintained without deteriorating recording quality of facsimile and imaging quality of the copy machine and composite machine.

The surface roughness of the surface of the contact glass 21 facing the document is determined to 0.5 S or less while this facing surface is treated with the fluorine coat material. Consequently, contaminants and dust are generally not attached to the document reading position of the contact glass 21, and the document image can be precisely read.

The fluorine coat material is coated by vacuum deposition in the embodiment of the present invention. This enables the effect for preventing the contaminants and dust from attaching to be more enhanced than coating by other methods, and the document image to be precisely read.

The lower limit of the coat material for obtaining the contamination preventive effect can be clarified by forming the layer of the fluorine coat material at a thickness of 0.001 to 0.1 μm. Applying the coating film on the contact glass 21 enables the practical image reading apparatus to be provided from the functional and economical point of view.

FIGS. 6 to 13 show another embodiment of the image reading apparatus and recording apparatus with the image reading apparatus according to the present invention. The same members as in the embodiment are given the same reference numerals, and descriptions thereof are omitted.

Figure 6:
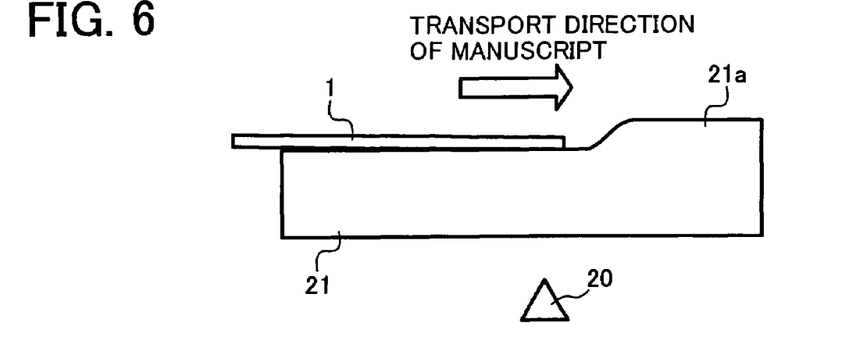
FIGS. 6 and 7 are side views showing a front end of the document while the document is being transported on another embodiment of the contact glass including a step.
Figure 7:
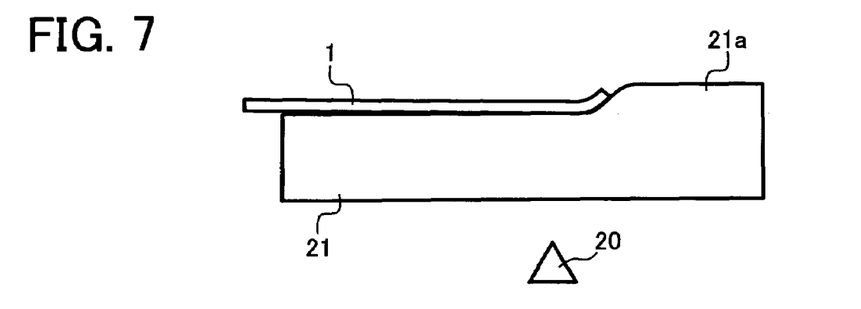
Figure 8:
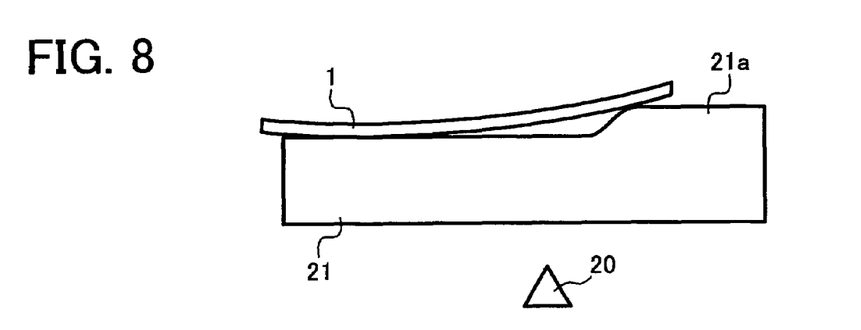
FIG. 8 is a side view showing a middle portion of the document while the document is being transported on the contact glass including the step.
Figure 9:
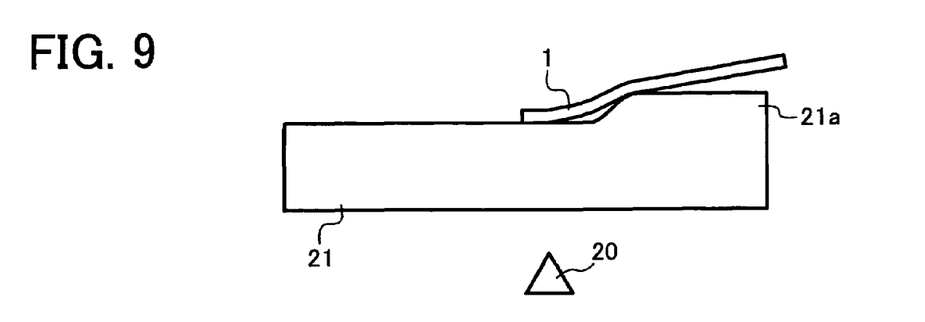
FIG. 9 is a side view showing a rear end of the document while the document is being transported on the contact glass including the step.

FIGS. 6 and 7 are side views showing a front end of the document while the document is being transported on the contact glass including a step. FIG. 8 is a side view showing a middle portion of the document while the document is being transported on the contact glass including the step. FIG. 9 is a side view showing a rear end of the document while the document is being transported on the contact glass including the step.

The document can be transported while only the front end and rear end of the document contact the contact glass by providing a step 21a at the downstream side of the document reading position. As a result, frictional force is reduced to enable durability of the coating film applied for surface modification.

Figure 10:
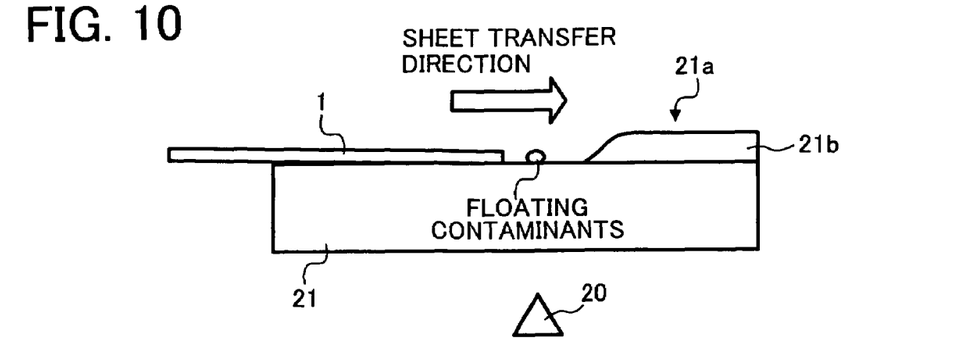
FIGS. 10-12 show side view of the front end of the document eliminating a contaminant.
Figure 11:
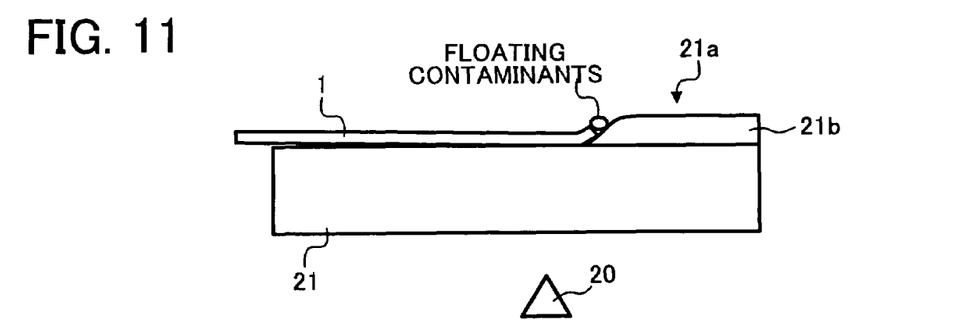
Figure 13:
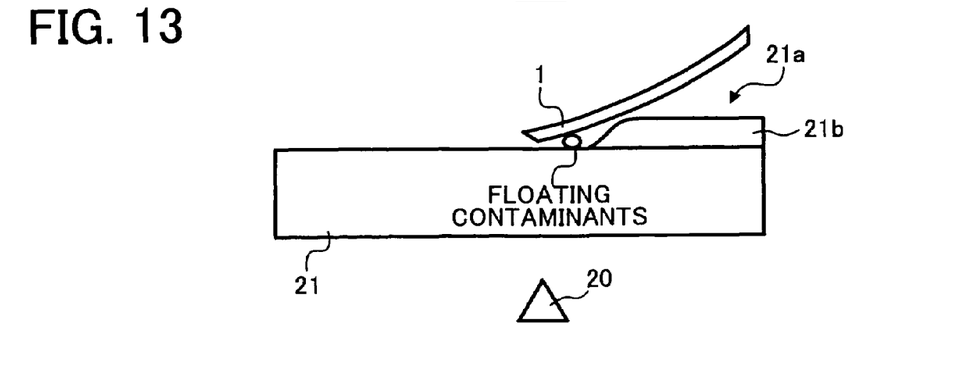
FIG. 13 shows a side view of the rear end of the document eliminating the contaminant.

FIGS. 10-12 show side view of the front end of the document eliminating a contaminant, and FIG. 13 shows a side view of the rear end of the document eliminating the contaminant.

The step 21a is tapered, and the top and bottom of the taper are rounded. Therefore, floating contaminants (such as recording medium powders), if any, at the reading position can be pushed out with the front end of the document (see FIGS. 10 to 12).

The contact glass used in the embodiment has a surface roughness of 0.5 S or less, and the surface has surface characteristics that permit contaminants to resist attachment to the surface. Thus, even when contaminants such as particles of additives and surface modification agents of the document recording medium, are deposited on the surface of the contact glass, these contaminants temporarily rest, rather than being adhered, on the surface. Because the contaminants are not adhered to the contact glass, the contaminants at the rear end of the document may be also removed from the reading position by being dragged with the document.

The contact glass 21 having the step 21a at the downstream side of the reading position can be manufactured as follows.

A step material 21b rounded at the top and bottom of the taper is bonded onto the flat contact glass 21, which can be separately manufactured. For example, the planar (flat) contact glass 21 and step material 21b rounded at the top and bottom of the taper are formed using two independent glass materials, and the latter is bonded to the former using a UV curable adhesive. Alternatively, these members may be formed with a transparent resin such as an acrylic resin. Such a manufacturing method enables the contact glass, even when its shape is complex, to be formed by a combination of simple portions.

The contact glass 21 having tapered convex step may be monolithically molded with a light-permeable glass or resin (integrated molding). Such a manufacturing method enables assembly of the apparatus to be easy and the assemble time to be shortened by reducing the number of portions.

Since the step 21a of the contact glass 21 is tapered with rounded bottom portion and top portion of the taper, floating contaminants (such as recording medium powder) at the reading position, if any, can be pushed out with the front end of the document. In addition, the rear end of the document in contacts the contact glass 21 can also remove the floating contaminants from the reading position to enable abnormal images to be eliminated. The rounded shape of the taper may be either formed by molding, or may be shaped by machining such as cutting and grinding.

Since the step member 21b (see FIG. 10) is integrated with the flat contact glass 21 on the contact glass, the contact glass 21 may be precisely formed with a high mechanical strength.

The contact glass having the shape of this embodiment can be manufactured for a relatively low cost by bonding the step member 21b on the flat contact glass 21 without any complex processing.

No contaminants and dust are attached to the image reading position of the light-permeable member in the image reading apparatus and image recording apparatus with the image reading apparatus of the present invention, and the contaminants are not read as image data. Consequently, the apparatus of the invention is able to precisely read the image on the document. The apparatus is useful as an image reading apparatus applied for copy machines and composite machine, and as a recording apparatus (copy machine) mounting the reading apparatus.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

This patent specification is based on Japanese patent application no. 2004-000670, filed on Jan. 5, 2004, and application no. 2004-164712, filed on Jun. 2, 2004, the disclosures of which are incorporated by reference herein in their entirety.

What is claimed is:

1. An image reading apparatus, comprising:
   an image reading unit configured to read an image from a document, the image reading unit comprising:
   a light permeable member having a surface configured to face the image on the document, the surface having a roughness of at most 0.5 S, and
   a coating disposed on the surface of the light permeable member configured to contact the document, the coating configured to prevent adherence of contaminants on the surface.

2. The image reading apparatus according to claim 1, wherein the coating comprises fluorine.

3. The image reading apparatus according to claim 2, wherein the coating is coated by vacuum deposition on the surface of the light permeable member.

4. The image reading apparatus according to claim 2, wherein a thickness of the fluorine is from 0.001 μm to 0.1 μm.

5. The image reading apparatus according to claim 1, wherein the light permeable member comprises a first portion configured to read the image from the document and a second portion including a step, wherein the step is configured to contact the document.

6. The image reading apparatus according to claim 5, wherein the second portion is disposed downstream in a direction of document conveyance over the light permeable member.

7. The image reading apparatus according to claim 6, wherein the first portion has a generally flat shape.

8. The image reading apparatus according to claim 7, wherein the step has a convex shape.

9. The image reading apparatus according to claim 8, wherein the convex step has a tapered shape, and bottom and top edges of the tapered shape are rounded.

10. The image reading apparatus according to claim 5, wherein the first and second portions are integral.

11. The image reading apparatus according to claim 5, wherein the first and second portions are joined together.

12. An image forming apparatus, comprising:
the image reading apparatus according to claim 1;
a data processing unit configured to process data from the image read from the document;
a transmission unit configured to transmit the processed data; and
an image writing apparatus configured to form a visible image on a recording medium corresponding to the processed data.

13. An image reading apparatus, comprising:
means for reading an image from a document, the means for reading comprising:
  means for permitting light to be transmitted from the image of the document, the means for permitting comprising a surface having a roughness of at most 0.5 S, and
  means for preventing adherence of contaminants, the means for preventing coated on the surface.

14. The image reading apparatus according to claim 13, wherein the means for permitting comprises a light permeable member.

15. The image reading apparatus according to claim 14, wherein the means for preventing comprises a fluorine coating disposed on the surface of the light adhering member, the fluorine coating having a thickness from 0.001 μm to 0.1 μm.

* * * * *